US011255059B2

(12) United States Patent
Engelmann et al.

(10) Patent No.: US 11,255,059 B2
(45) Date of Patent: Feb. 22, 2022

(54) MILLING MACHINE HAVING A NON-CONTACT LEG-HEIGHT MEASUREMENT SYSTEM

(71) Applicant: CATERPILLAR PAVING PRODUCTS INC., Brooklyn Park, MN (US)

(72) Inventors: Eric S. Engelmann, Delano, MN (US); Conwell K. Rife, Jr., Wayzata, MN (US); Joseph Forcash, Clayton, NC (US); Clayton Padgett, Moncure, NC (US); Andrew Whitten, Dunlap, IL (US); Paul Friend, Morton, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 16/774,334

(22) Filed: Jan. 28, 2020

(65) Prior Publication Data
US 2021/0229516 A1  Jul. 29, 2021

(51) Int. Cl.
*E01C 23/088* (2006.01)
*G01B 11/02* (2006.01)
*G01B 11/14* (2006.01)

(52) U.S. Cl.
CPC ........ *E01C 23/088* (2013.01); *B60G 2300/09* (2013.01); *B60G 2400/252* (2013.01);
(Continued)

(58) Field of Classification Search
CPC .............................. E01C 23/088; E01C 23/127
See application file for complete search history.

(56) References Cited

U.S. PATENT DOCUMENTS 3,802,525 A   4/1974  Snow, Jr. et al.
4,139,318 A   2/1979  Jakob et al.
(Continued)

FOREIGN PATENT DOCUMENTS

EP         1624278 A1 *  2/2006  .......... B60G 17/019
KR       950001048 B1    2/1995
WO    WO 2002/057112 A1  7/2002

OTHER PUBLICATIONS

U.S. Patent Application of Eric S. Engelmann et al., entitled "Milling Machine Having a Valve Current Based Height Measurement System," filed Jan. 28, 2020.
(Continued)

*Primary Examiner* — Janine M Kreck
(74) *Attorney, Agent, or Firm* — Finnegan, Henderson, Farabow, Garrett & Dunner LLP

(57) ABSTRACT

A milling machine may have a frame, a milling drum attached to the frame, and ground engaging tracks that support the frame and propel the milling machine in a forward or rearward direction. The milling machine may have at least one actuator connecting the frame to at least one of the ground engaging tracks. The actuator may adjust a height of the frame relative to at least one of the tracks. The milling machine may also have a non-contact leg-height sensor attached to the frame. The sensor may generate a signal indicative of a height of the frame relative to at least one of the tracks. The milling machine may also have a controller configured to determine the height based on the signal.

14 Claims, 5 Drawing Sheets

(52) U.S. Cl.
CPC ........ *B60G 2500/30* (2013.01); *G01B 11/022* (2013.01); *G01B 11/14* (2013.01)

(56) References Cited

U.S. PATENT DOCUMENTS

| | | |
|---|---|---|
| 4,186,968 A | 2/1980 | Barton |
| 4,325,580 A | 4/1982 | Swisher, Jr. et al. |
| 4,678,236 A | 7/1987 | Wirtgen |
| 4,943,119 A | 7/1990 | Zarniko et al. |
| 5,092,659 A | 3/1992 | Grathoff |
| 5,189,940 A | 3/1993 | Hosseini et al. |
| 5,309,407 A | 5/1994 | Sehr et al. |
| 5,378,081 A | 1/1995 | Swisher, Jr. |
| 5,467,541 A | 11/1995 | Greer et al. |
| 5,588,776 A | 12/1996 | Swisher, Jr. et al. |
| 5,893,677 A | 4/1999 | Haehn et al. |
| 5,984,420 A * | 11/1999 | Murray ................ E01C 19/00 172/4.5 |
| 6,152,648 A | 11/2000 | Gfroerer et al. |
| 6,234,061 B1 | 5/2001 | Glasson |
| 6,450,048 B1 | 9/2002 | Samuelson et al. |
| 6,769,836 B2 | 8/2004 | Lloyd |
| 6,923,508 B2 | 8/2005 | Holl et al. |
| 7,946,788 B2 | 5/2011 | Jurasz et al. |
| 8,113,592 B2 * | 2/2012 | Busley ................ B60G 17/015 299/39.6 |
| 8,128,177 B2 | 3/2012 | Menzenbach et al. |
| 8,246,270 B2 | 8/2012 | Berning et al. |
| 8,308,395 B2 | 11/2012 | Jurasz et al. |
| 8,511,932 B2 | 8/2013 | Jurasz et al. |
| 8,690,474 B2 | 4/2014 | Jurasz et al. |
| 8,807,867 B2 | 8/2014 | Berning et al. |
| 9,010,871 B2 | 4/2015 | Busley et al. |
| 9,523,176 B2 | 12/2016 | Berning et al. |
| 9,656,530 B2 | 5/2017 | Busley et al. |
| 9,879,390 B2 | 1/2018 | Berning et al. |
| 9,879,391 B2 | 1/2018 | Berning et al. |
| 10,266,996 B2 * | 4/2019 | Hogan ................ B62D 55/065 |
| 2002/0100649 A1 | 8/2002 | Agrotis et al. |
| 2006/0024134 A1 | 2/2006 | Rio et al. |
| 2007/0098494 A1 | 5/2007 | Mares |
| 2008/0153402 A1 | 6/2008 | Arcona et al. |
| 2017/0362784 A1 | 12/2017 | Hoffmann et al. |
| 2018/0180068 A1 | 6/2018 | Fukuda et al. |

OTHER PUBLICATIONS

U.S. Patent Application of Eric S. Engelmann et al., entitled "Milling Machine Having a Fluid Flow Based Height Measurement System," filed Jan. 28, 2020.

* cited by examiner

MILLING MACHINE HAVING A NON-CONTACT LEG-HEIGHT MEASUREMENT SYSTEM

TECHNICAL FIELD

The present disclosure relates generally to a milling machine and, more particularly, to a milling machine having a non-contact leg-height measurement system.

BACKGROUND

Road surfaces typically include an uppermost layer of asphalt or concrete on which vehicles travel. Over time, a road surface may wear out or may be damaged, for example, due to the formation of potholes or development of cracks and ruts. The damaged road surface may in turn cause damage to vehicles travelling on the road surface. The damaged road surface can be repaired locally by filling up the potholes, cracks, and/or ruts. However, it is often desirable to replace the worn or damaged road surface with an entirely new road surface. This is usually accomplished by removing a layer of the asphalt or concrete from the roadway and repaving the roadway by laying down a new layer of asphalt or concrete.

A milling machine is often used to remove the layer of asphalt or concrete on the roadway surface. A typical milling machine includes a frame supported on wheels or tracks by height adjustable leg columns and including a milling drum attached to the frame. As the milling machine is driven over the existing roadway surface, teeth or cutting tools on the rotating milling drum come into contact with the roadway surface and tear up a layer of the roadway. A milling drum chamber typically encloses the milling drum to contain the milled material. The milled material is typically transported using a conveyor system to an adjacent vehicle, which removes the material from the worksite. Following the milling process, a new layer of asphalt or concrete may be applied on the milled road surface to create a new roadway surface.

In another application, it is sometimes desirable to stabilize or reconstitute the upper layer of a roadway or a worksite. This is usually accomplished by removing the upper layer, mixing it with stabilizing components such as cement, ash, lime, etc., and depositing the mixture back on top of the roadway or worksite. A milling machine, such as a stabilizer or reclaimer is often used for this purpose. Such milling machines may also include a frame supported on tracks or wheels by height adjustable leg columns and including a milling drum attached to the frame. The milling drum is enclosed in a drum chamber. The cutting tools or teeth on the milling drum tear up the ground and push the removed material toward a rear of the drum chamber. Stabilizing ingredients and/or water are mixed with the milled material, which is then deposited back on to the ground towards the rear of the drum chamber.

In both types of milling machines discussed above, it is often necessary to position the frame at a desired height and/or orientation relative to the ground surface. For example, it may be necessary to orient the frame at a predetermined inclination relative to the ground surface to achieve a corresponding inclination of the milled surface. It may also be necessary to raise the frame to a desired height to perform maintenance operations. It is therefore desirable to accurately determine a height and/or an inclination of the frame relative to the ground surface.

Externally attached sensors, for example, ultrasonic grade sensors may be used to determine and adjust the height and orientation of the frame. Ultrasonic sensors, however, may not provide a desired level of accuracy. Moreover, use of such external sensors entails the additional and possibly inconvenient steps of connecting those sensors to the milling machine and its control systems. It may also be possible to use proximity sensors located on the leg columns to position the frame. However, proximity sensors may enable positioning of the frame only at discrete heights above the ground surface based on where the proximity sensors are mounted on the machine. It is, therefore, desirable to equip a milling machine with height sensors that may help accurately position the frame at any desired height and/or orientation relative to a ground surface.

The milling machines and/or the non-contact leg-height sensors of the present disclosure solve one or more of the problems set forth above and/or other problems of the prior art.

SUMMARY

In one aspect, the present disclosure is directed to a milling machine. The milling machine may include a frame and a milling drum attached to the frame. The milling machine may also include a plurality of ground engaging tracks configured to support the frame and to propel the milling machine in a forward or rearward direction. Further, the milling machine may include at least one actuator connecting the frame to at least one track from the ground engaging tracks. The at least one actuator may be configured to adjust a height of the frame relative to at least one track from the plurality of tracks. The milling machine may include a non-contact sensor attached to the frame. The sensor may be configured to generate a signal indicative of a height of the frame relative to the at least one track. The milling machine may also include a controller configured to determine the height based on the signal.

In another aspect, the present disclosure is directed to a milling machine. The milling machine may include a frame. The milling machine may also include a left front track disposed adjacent a front end of the frame, a right front track disposed adjacent the front end and spaced apart from the left front track, and a rear track disposed adjacent a rear end of the frame. Further, the milling machine may include a left front actuator connecting the frame and the left front track, a right front actuator connecting the frame and the right front track, and a rear actuator connecting the frame and the rear track. Each of the left front actuator, the right front actuator, and the rear actuator may be configured to selectively adjust a height of the frame relative to the left front track, the right front track, and the at least one rear track, respectively. The milling machine may include a milling drum connected to the frame and disposed between the front end and the rear end. The milling machine may also include an engine configured to rotate the milling drum and propel the left front track, the right front track, or the rear track in a forward or rearward direction. Further, the milling machine may include at least one non-contact sensor attached to the frame. The sensor may be configured to generate at least one signal indicative of a height of the frame relative to at least one of the left front track, the right front track, and the rear track. In addition, the milling machine may include a controller configured to determine the height of the frame relative to the at least one of the left front track, the right front track and the rear track based on the at least one signal.

DETAILED DESCRIPTION

Figure 1:
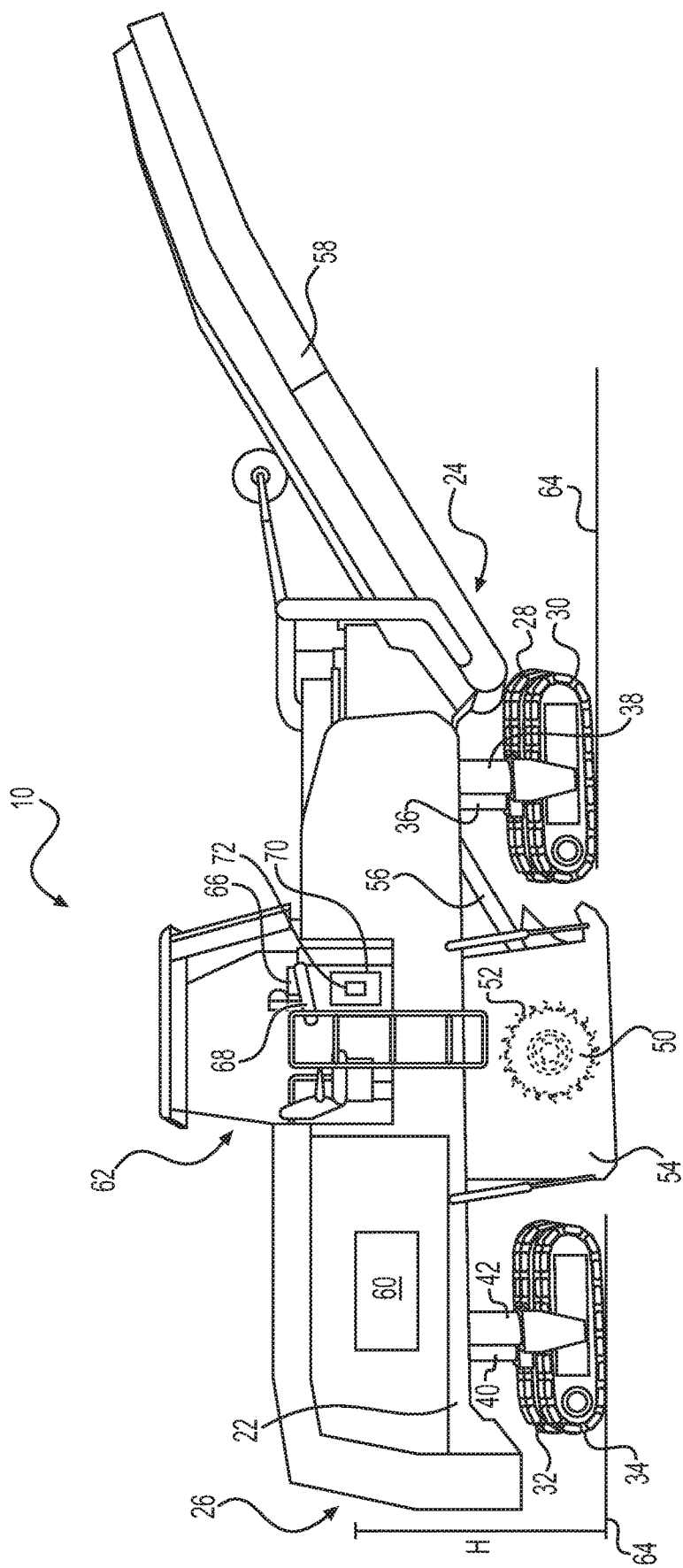
FIG. 1 is an illustration of an exemplary milling machine.
Figure 2:
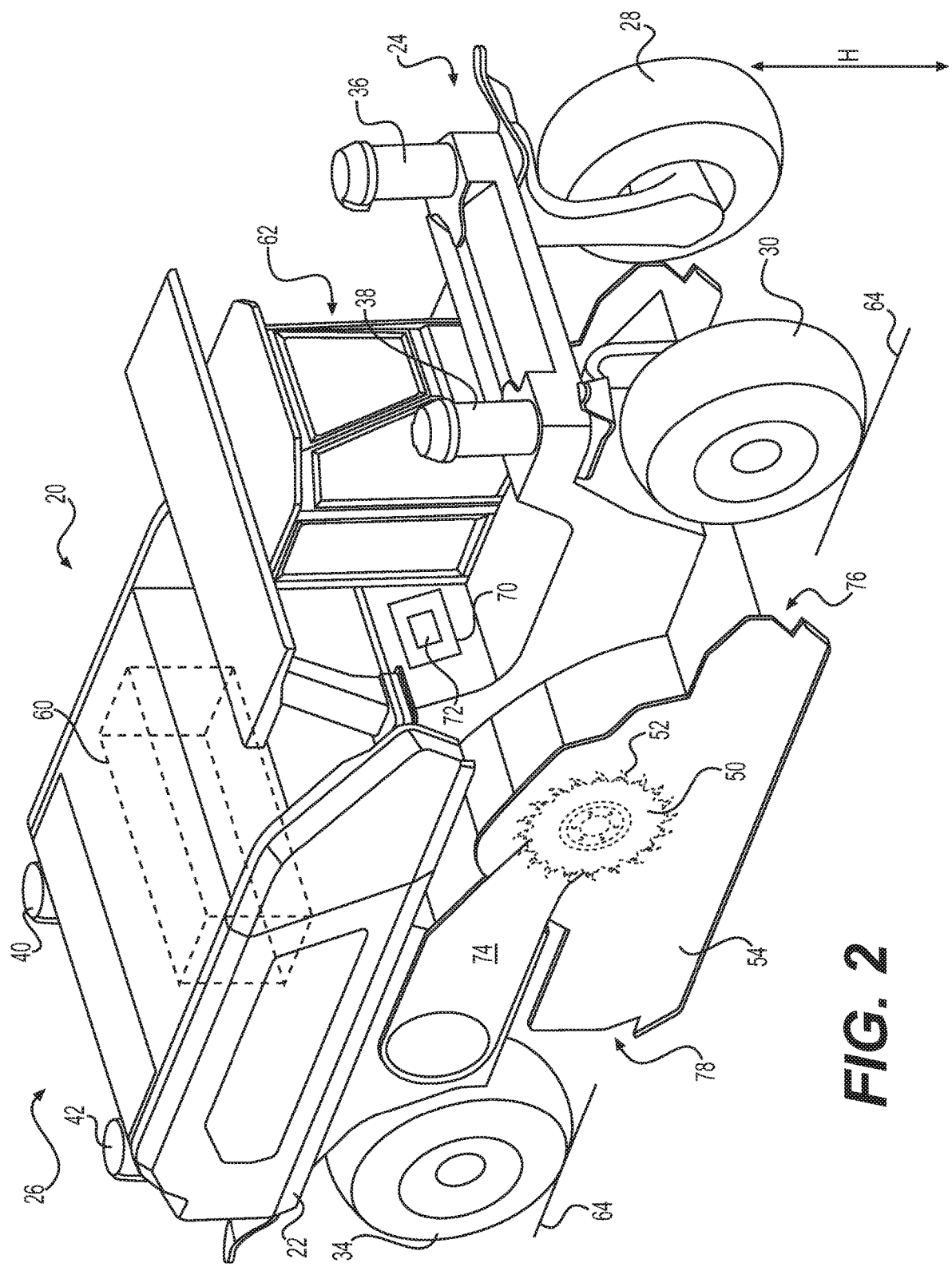
FIG. 2 is an illustration of another exemplary milling machine.

FIGS. 1 and 2 illustrate exemplary milling machines 10 and 20, respectively. In one exemplary embodiment as illustrated in FIG. 1, milling machine 10 may be a cold planer, which may also be referred to as a cold milling machine, a scarifier, a profiler, etc. Milling machine 10 may include frame 22, which may extend from first end 24 to second end 26 disposed opposite first end 24. In some exemplary embodiments, first end 24 may be a front end and second end 26 may be a rear end of frame 22. Frame 22 may have any shape (e.g. rectangular, triangular, square, etc.)

Frame 22 may be supported on one or more propulsion devices. For example, as illustrated in FIG. 1, frame 22 may be supported on propulsion devices 28, 30, 32, 34. Propulsion devices 28, 30, 32, 34 may be equipped with electric or hydraulic motors which may impart motion to propulsion devices 28, 30, 32, 34 to help propel machine 10 in a forward or rearward direction. In one exemplary embodiment as illustrated in FIG. 1, propulsion devices 28, 30, 32, 34 may take the form of tracks, which may include, for example, sprocket wheels, idler wheels, and/or one or more rollers that may support a continuous track. However, it is contemplated that propulsion devices 28, 30, 32, 34 of milling machine 10 may take the form of wheels (see FIG. 2.) In the present disclosure, the terms track and wheel will be used interchangeably and will include the other of the two terms.

Tracks 28, 30 may be located adjacent first end 24 of frame 22 and tracks 32, 34 may be located adjacent second end 26 of frame 22. Track 28 may be spaced apart from track 30 along a width direction of frame 22. Likewise, track 32 may be spaced apart from track 34 along a width direction of frame 22. In one exemplary embodiment as illustrated in FIG. 1, track 28 may be a left front track, track 30 may be a right front track, track 32 may be a left rear track, and track 34 may be a right rear track. Some or all of propulsion devices 28, 30, 32, 34 may also be steerable, allowing machine 10 to be turned towards the right or left during a forward or rearward motion on ground surface 64. Although milling machine 10 in FIG. 1 has been illustrated as including four tracks 28, 30, 32, 34, it is contemplated that in some exemplary embodiments, milling machine 10 may have only one rear track 32 or 34, which may be located generally centered along a width of frame 22.

Frame 22 may be connected to tracks 28, 30, 32, 34 by one or more leg columns 36, 38, 40, 42. For example, as illustrated in FIG. 1, frame 22 may be connected to left front track 28 via leg column 36 and to right front track 30 via leg column 38. Likewise, frame 22 may be connected to left rear track 32 via leg column 40 and to right rear track 34 via leg column 42. One or more of leg columns 36, 38, 40, 42 may be height adjustable such that a height of frame 22 relative to one or more of tracks 28, 30, 32, 34 may be increased or decreased by adjusting a length of one or more of leg columns 36, 38, 40, 42, respectively. It will be understood that adjusting a height of frame 22 relative to one or more of tracks 28, 30, 32, 34 would also adjust a height of frame 22 relative to ground surface 64 on which tracks 28, 30, 32, 34 may be supported.

Machine 10 may include milling drum 50, which may be attached to frame 22 between front end 24 and rear end 26. Milling drum 50 may include cutting tools 52 (or teeth 52) that may be configured to cut into and tear up a predetermined thickness of a roadway or the ground. A height of milling drum 50 relative to the ground surface 64 may be adjusted by adjusting a height of one or more leg columns 36, 38, 40, 42. As milling drum 50 rotates, teeth 52 of milling drum 50 may come into contact with the ground or roadway surface, thereby tearing up or cutting the ground or roadway surface. Milling drum 50 may be enclosed within drum chamber 54 which may help contain the material removed by teeth 52 from the ground or roadway surface. Machine 10 may include one or more conveyors 56, 58, which may help transport the material removed by milling drum 50 to an adjacent vehicle such as a dump truck.

Milling machine 10 may include engine 60, which may be attached to frame 22. Engine 60 may be any suitable type of internal combustion engine, such as a gasoline, diesel, natural gas, or hybrid-powers engine. It is contemplated, however, that in some exemplary embodiments, engine 60 may be driven by electrical power. Engine 60 may be configured to deliver rotational power output to one or more hydraulic motors associated with propulsion devices 28, 30, 32, 34, to milling drum 50, and to the one or more conveyors 56, 58. Engine 60 may also be configured to deliver power to operate one or more other components or accessory devices (e.g. pumps, fans, motors, generators, belt drives, transmission devices, etc.) associated with milling machine 10.

Milling machine 10 may include operator platform 62, which may be attached to frame 22. In some exemplary embodiments, operator platform 62 may be in the form of an open-air platform that may or may not include a canopy. In other exemplary embodiments, operator platform 62 may be in the form of a partially or fully enclosed cabin. As illustrated in FIG. 1, operator platform 62 may be located at a height "H" above ground surface 64. In some exemplary embodiments, height H may range between about 2 ft to 10 ft above ground surface 64. Operator platform 62 may include one or more controls 66, which may be used by an operator to operate and/or control milling machine 10. Control 66 may include one or more input devices 66, which may take the form of buttons, switches, sliders, levers, wheels, touch screens, or other input/output or interface devices. Milling machine 10 may include display 68 located in operator platform 62. Display 68 may be configured to display information, data, and/or measurements obtained from one or more sensors of milling machine 10. Display 68 may also be configured to display diagnostic results, errors, and/or alerts. Display 68 may be a cathode ray tube (CRT) monitor, a liquid crystal display (LCD), a light emitting diode (LED) display, a touchscreen display, or any other kind of display.

Milling machine 10 may also include controller 70, which may be configured to receive inputs, data, and/or signals from the one or more input devices 66, and other sensors associated with milling machine 10 and to control the operation of one or more components (e.g. engine 60, milling drum 50, propulsion devices 28, 30, 32, 34, conveyors 56, 58, etc.) Controller 70 may include or be associated with one or more processors, memory devices 72, and/or communication devices. Controller 70 may embody a single microprocessor or multiple microprocessors, digital signal processors (DSPs), application-specific integrated circuit devices (ASICs), etc. Numerous commercially available microprocessors may be configured to perform the functions of controller 70. Various other known circuits may be associated with controller 70, including power supply circuits, signal-conditioning circuits, and communication circuits, etc. Controller 70 may also include one or more internal timers configured to monitor a time at which controller 70 may receive signals from one or more sensors or a time at which controller 70 may issue command signals to one or more components of milling machine 10.

The one or more memory devices 72 associated with controller 70 may store, for example, data and/or one or more control routines or instructions. The one or more memory devices 72 may embody non-transitory computer-readable media, for example, Random Access Memory (RAM) devices, NOR or NAND flash memory devices, and Read Only Memory (ROM) devices, CD-ROMs, hard disks, floppy drives, optical media, solid state storage media, etc. Controller 70 may receive one or more input signals from the one or more input devices 66, and may execute the routines or instructions stored in the one or more memory devices 72 to generate and deliver one or more command signals to one or more of propulsion devices 28, 30, 32, 34, engine 60, milling drum 50, conveyors 56, 58, or other components of milling machine 10.

FIG. 2 illustrates another exemplary embodiment of a milling machine. In one exemplary embodiment as illustrated in FIG. 2, milling machine 20 may be a reclaimer, which may also be called soil stabilizer, reclaiming machine, road reclaimer, etc. Like milling machine 10, milling machine 20 may include frame 22, propulsion devices in the form of wheels 28, 30, 32 (not visible in FIG. 2), 34, and leg columns 36, 38, 40, 42. In some exemplary embodiments, one or more leg columns 36, 38, 40, 42 may be height adjustable such that a height of frame 22 relative to one or more of wheels 28, 30, 32, 34 may be increased or decreased by adjusting a length of one or more leg columns 36, 38, 40, 42, respectively. As illustrated in FIG. 2, leg column 36 may connect frame 22 to the left front wheel 28, leg column 38 may connect frame 22 to a right front wheel 30, leg column 40 may connect frame 22 to left rear wheel 32 (not visible in FIG. 2), and leg column 42 may connect frame 22 to right rear wheel 34. Although, milling machine 20 has been illustrated in FIG. 2 as including wheels 28, 30, 32, 34, it is contemplated that milling machine 20 may instead include tracks 28, 30, 32, 34. One or more of wheels 28, 30, 32, 34 may be steerable, allowing milling machine 20 to be turned towards the right or left during a forward or rearward motion on ground surface 64.

Milling drum 50 of milling machine 20 may be located between first end 24 and second end 26. In one exemplary embodiment as illustrated in FIG. 2, milling drum 50 of milling machine 20 may not be directly attached to frame 22. Instead, as illustrated in FIG. 2 milling drum 50 of milling machine 20 may be attached to frame 22 via arms 74. Arms 74 may include a pair of arms (only one of which is visible in FIG. 2) disposed on either side of milling machine 20. Arms 74 may be pivotably attached to frame 22 and may be configured to be rotatable relative to frame 22. One or more actuators may be connected between frame 22 and arms 74 and may be configured to move arms 74 relative to frame 22. Thus, unlike milling machine 10, milling drum 50 of milling machine 20 may be movable relative to frame 22. It is contemplated, however, that in other exemplary embodiments, milling drum 50 may be directly attached to frame 22 of machine 20 in a manner similar to that described above for machine 10.

Milling drum 50 of milling machine 20 may include cutting tools 52 (or teeth 52). A height of milling drum 50 above the ground surface may be adjusted by rotating arms 74 relative to frame 22 and/or by adjusting one or more of leg columns 36, 38, 40, 42. As milling drum 50 rotates, teeth 52 may come into contact with and tear or cut the ground or roadway surface. Milling drum 50 may be enclosed within drum chamber 54 which may help contain the material removed by teeth 52 from the ground or roadway surface. Rotation of milling drum 50 may cause the removed material to be transferred from adjacent front end 76 of drum chamber 54 towards rear end 78 of drum chamber 54. Stabilizing components such as ash, lime, cement, water, etc. may be mixed with the removed material and the reconstituted mixture of the milled material and the stabilizing components may be deposited on ground surface 64 adjacent rear end 78 of drum chamber 54.

Like milling machine 10, milling machine 20 may also include engine 60, operator platform 62, one or more control or input devices 66, display 68, and controller 70, all of which may have structural and functional characteristics similar to those discussed above with respect to milling machine 10. Additionally, it will be understood that as used in this disclosure the terms front and rear are relative terms, which may be determined based on a direction of travel of milling machine 10 or 20. Likewise, it will be understood that as used in this disclosure, the terms left and right are relative terms, which may be determined based on facing the direction of travel of milling machine 10 or 20.

Figure 3:
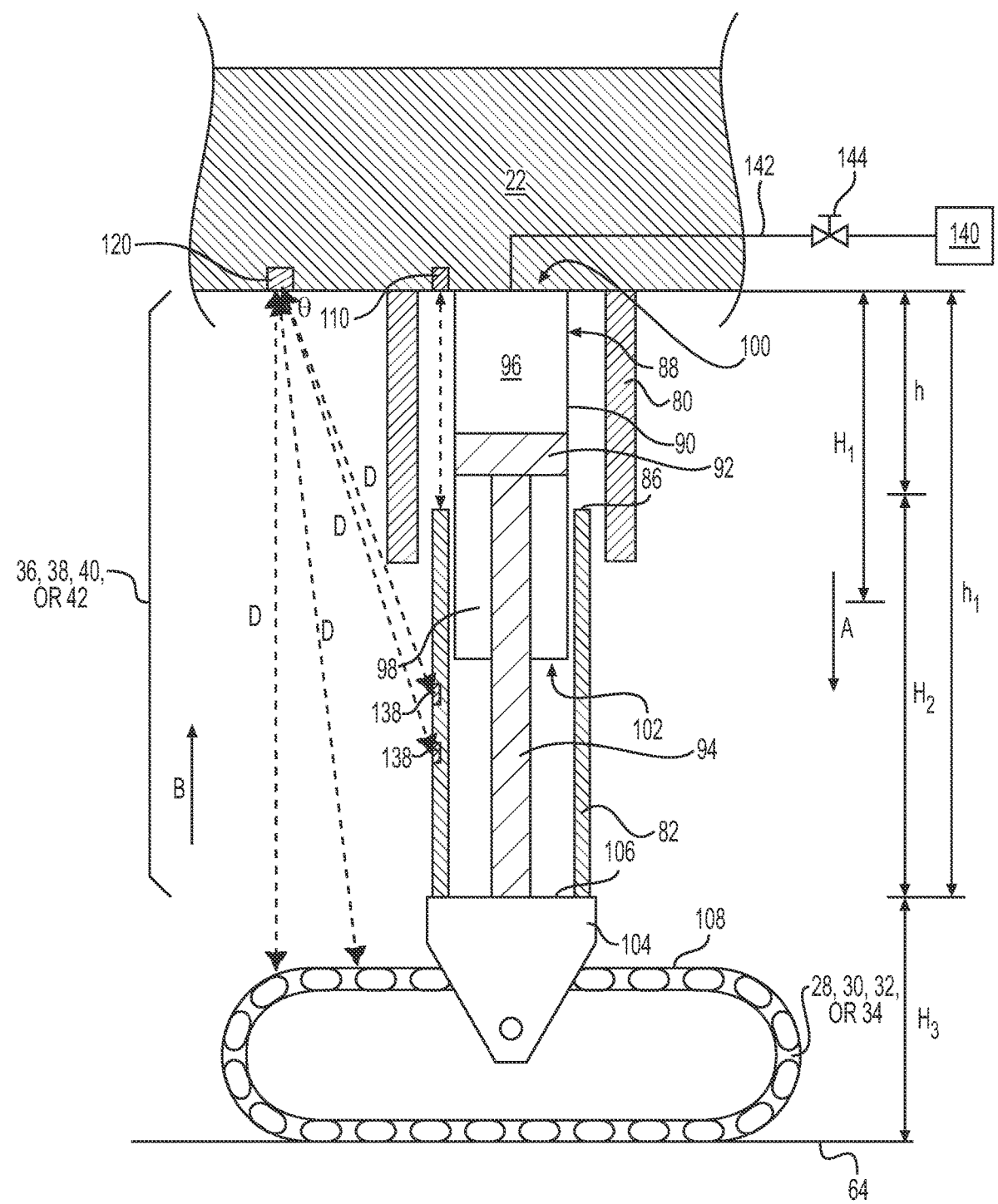
FIG. 3 is a partial cross-section view illustration of an exemplary leg column for the milling machines of FIGS. 1 and 2, including a non-contact leg-height sensor.

FIG. 3 is a partial cross-sectional view illustration of an exemplary leg column 36, 38, 40, 42 for milling machine 10 or 20. Leg column 36 may include first (or upper) section 80 and second (or lower) section 82. Actuator 88 may be disposed within or outside leg column 36. First section 80 may be attached to frame 22. In one exemplary embodiment, first section 80 may be rigidly attached to frame 22. First section 80 may extend from frame 22 towards track 28. In some exemplary embodiments, first section 80 may also extend into frame 22 in a direction away from track 28. As illustrated in FIG. 3, edge 84 of first section 80 may have a height "$H_1$" relative to frame 22. Second section 82 may be attached to track 28 and may extend from track 28 toward frame 22. As illustrated in FIG. 3, edge 86 of second section 82 may have a height "$H_2$" relative to track 28. As also illustrated in FIG. 3, track 28 may have a height "$H_3$" relative to ground surface 64. Heights $H_1$, $H_2$, and $H_3$ may be fixed and may be determined based on the geometrical dimensions of machine 10 or 20.

In one exemplary embodiment as illustrated in FIG. 3, first and second sections 80, 82 may be hollow cylindrical tubes. It is contemplated, however, that first and second sections 80, 82 may have other non-cylindrical shapes. First and second sections 80, 82 may be configured to slidably move relative to each other. As illustrated in the exemplary embodiment of FIG. 3, second section 82 may have a smaller cross-section relative to first section 80 and may be received within first section 80. It is contemplated, however, that in other exemplary embodiments, first section 80 may have a smaller cross-section relative to second section 82 and may be received within second section 82. First and second sections 80, 82 may form a variable height enclosure within which actuator 88 may be located. It is also contemplated, however, that in some exemplary embodiments, actuator 88 may be located outside the enclosure formed by first and second sections 80, 82.

Actuator 88 may connect frame 22 with track 28. Actuator 88 may include cylinder 90, piston 92, and rod 94. Cylinder 90 may extend from frame end 100 connected to frame 22 to track end 102 which may be disposed between frame 22 and track 28. Piston 92 may be slidably disposed within cylinder 90 and may divide cylinder 90 into head-end chamber 96 and rod-end chamber 98. That is, piston 92 may be configured to slide within cylinder 90 from adjacent frame end 100 to adjacent track end 102. Head-end chamber 96 may be disposed nearer frame end 100 of cylinder 90 and rod-end chamber 98 may be disposed nearer track end 102 of cylinder 90. Rod 94 may be connected at one end to piston 92. Rod 94 may extend from piston 92, through track end 102 of cylinder 90, and may be directly or indirectly connected at an opposite end of rod 94 to track 28. In one exemplary embodiment as illustrated in FIG. 3, rod 94 may be connected to yoke 104, which in turn may be connected to track 28. In some exemplary embodiments, yoke 104 may be fixedly attached to second section 82 of leg column 36. In other exemplary embodiments, yoke 104 may be a part of track 28 and may be movably attached to second section 82. It is also contemplated that in some embodiments, yoke 104 may not be attached to second section 82.

Actuator 88 may be a single-acting or double-acting hydraulic actuator. For example, one or both of head-end chamber 96 and rod-end chamber 98 of actuator 88 may be configured to receive and hold hydraulic fluid. One or both of head-end chamber 96 and rod-end chamber 98 may be connected to tank 140 configured to store hydraulic fluid via one or more fluid conduits 142. One or more control valves 144 may be disposed in the one or more fluid conduits 142 and may be configured to control a flow rate or amount of flow of hydraulic fluid from tank 140 to actuator 88 or vice-versa. In one exemplary embodiment, separate fluid conduits 142 may connect head-end chamber 96 and rod-end chamber 98 with tank 140 and a separate control valve 144 may be disposed on the respective separate fluid conduits 142. Control valve 144 may be a multi-position or proportional type valve having a valve element movable to regulate a flow of hydraulic fluid through fluid conduit 142. In the flow-passing position, control valve 144 may permit hydraulic fluid to flow through fluid conduit 142, substantially unrestricted by control valve 144. In contrast, in the flow-blocking position, control valve 144 may completely block hydraulic fluid from flowing through fluid conduit 142. The valve element of control valve 144 may also be selectively movable to various positions between the flow-passing and flow-blocking positions to provide for variable flow rates of hydraulic fluid in fluid conduit 142. Controller 70 of machine 10 or 20 may be configured to adjust a position of the valve element of control valve 144, thereby controlling a flow rate or an amount of flow of hydraulic fluid flowing through fluid conduit 142. In some exemplary embodiments, the valve element of control valve 144 may be solenoid operable from the flow blocking position to the flow passing position.

Filling head-end chamber 96 with hydraulic fluid and/or emptying hydraulic fluid from rod-end chamber 98 may cause piston 92 to slidably move within cylinder 90 in a direction shown by arrow "A" from frame end 100 toward track end 102. Piston movement in direction A may result in an increase in a length of actuator 88, causing first and second sections 80 and 82 to slidably move relative to each other thereby increasing a height of leg column 36, and thereby also increasing a height of frame 22 relative to track 28 or a height of frame 22 relative to ground surface 64. Similarly, emptying hydraulic fluid from head-end chamber 96 and/or filling rod-end chamber 98 with hydraulic fluid may cause piston 92 to slidably move within cylinder 90 in a direction shown by arrow "B" from track end 102 towards frame end 100. Piston movement in direction B may decrease the length of actuator 88 thereby decreasing the height of leg column 36, which in turn may decrease the height of frame 22 relative to ground surface 64. Although actuator 88 (left front actuator 88) in FIG. 3 has been illustrated as being associated with left front leg column 36, it is contemplated that milling machine 10 or 20 may include one or more of right front actuator 88 associated with right front leg column 38 and left rear track 30, left rear actuator 88 associated with left rear leg column 40 and left rear track 32, and/or right rear actuator 88 associated with right rear leg column 42 and right rear track 34.

Figure 4:
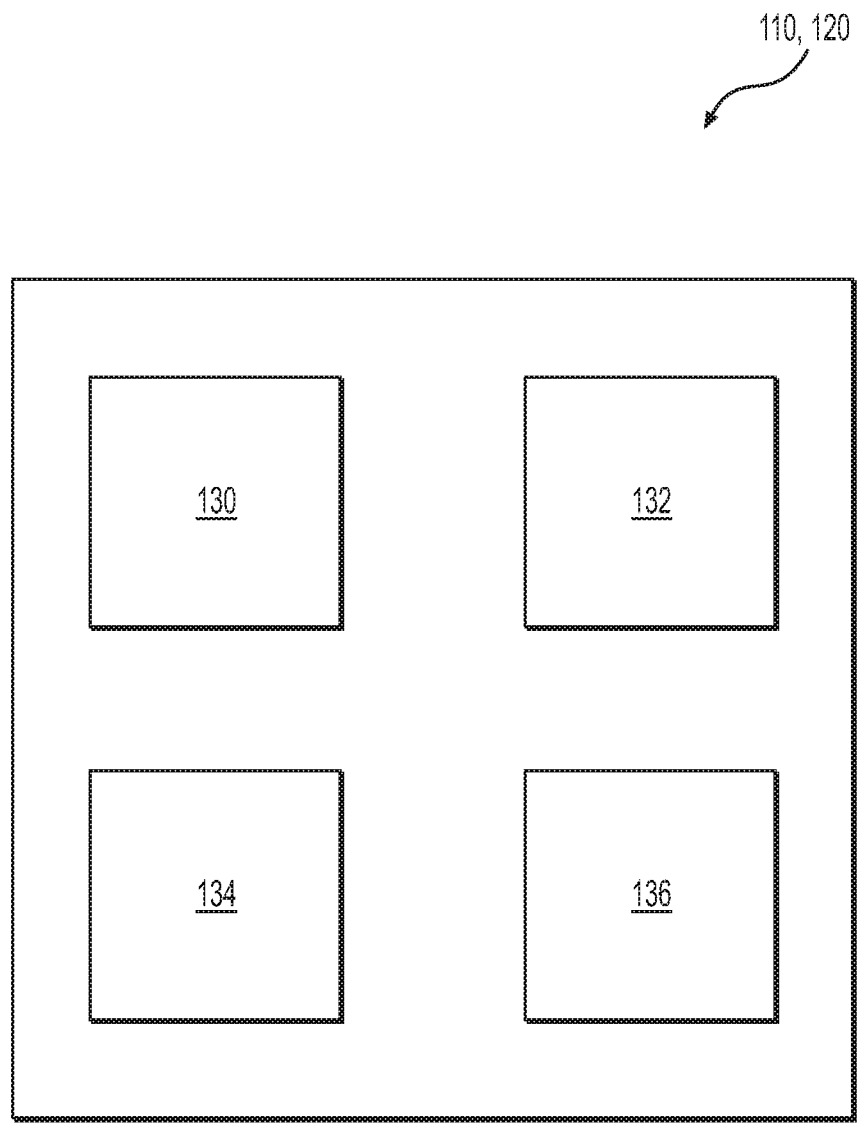
FIG. 4 is a schematic illustration of an exemplary non-contact height sensor for the milling machines of FIGS. 1 and 2.

Leg column 36 may include one or more non-contact leg-height sensors 110, 120. FIG. 4 illustrates a schematic of an exemplary non-contact leg-height sensors 110, 120. For example, sensors 110, 120 may include transmitter 130, receiver 132, processor 134, and memory 136. Processor 134 and memory 136 may have structural and functional characteristics similar to those of controller 70 and memory device 72 described above. It is contemplated that in some exemplary embodiments, sensors 110, 120 may not include processor 134 and/or memory 136 and may instead rely on controller 70 and memory device 72 of machine 10 or 20 to perform the functions of processor 134 and memory 136, respectively.

Transmitter 130 may be configured to transmit an emitter signal, which may include light, sound waves, or other types of electromagnetic radiation. For example, the emitter signal transmitted by transmitter 130 may include a beam of visible, infrared, near infrared, ultraviolet, or laser light. Alternatively, the emitter signal may include one of ultrasonic waves, radio waves, or microwaves, or a plurality of wavelengths. In one exemplary embodiment as illustrated in FIG. 3, non-contact leg-height sensor 110 may be attached to the frame adjacent leg column 36. As illustrated in FIG. 3, leg-height sensor 110 may be positioned on frame 22 such that transmitter 130 may transmit, for example, a collimated beam (e.g. of light) towards second (or lower) section 82. In one exemplary embodiment as illustrated in FIG. 3, transmitter 130 may transmit the beam generally perpendicular to the frame. As used in this disclosure, the term generally should be interpreted to encompass normal machining and manufacturing tolerances. For example, generally perpendicular should be interpreted as encompassing angles of 90±5° relative to frame 22. The beam transmitted by transmitter 130 may interact with edge 86 of second section 82 and may be reflected by edge 86 and/or other portions of second section 82. In some exemplary embodiments, one or more targets 138 may be attached to upper section 80, lower section 82, actuator 88, and/or track 28. The one or more targets 138 may also reflect the beam transmitted by transmitter 130.

Receiver 132 of leg-height sensor 110 may receive and detect at least a portion of a reflected emitter signal. For example, receiver 132 may detect a portion of the light, sound waves, radio waves, microwaves, etc. reflected by one or more of track 28, upper or lower sections 80, 82, actuator 88, and/or one or more targets 138. Receiver 132 may generate a signal indicative of the characteristics (e.g. wavelength, amplitude, frequency, phase, time, energy or power) of the detected portion of the reflected emitter signal. For example, the portion of the reflected emitter signal detected by receiver 132 may have a different wavelength, amplitude, frequency, phase, time, energy content or power, etc. based on height "h" of edge 86 from frame 22. Receiver 132 may transmit the generated signal to controller 70 and/or processor 134.

In one exemplary embodiment sensors 110, 120 may be configured to determine height h and transmit a signal to controller 70 indicative of the height h. For example, processor 134 associated with leg-height sensor 110 or 120 may determine height h based on one or more characteristics (e.g. wavelength, amplitude, frequency, phase, time, energy or power) of the detected portion of the reflected emitter signal received by receiver 132. Correlations in the form of charts, graphs, look up tables, mathematical algorithms, etc. between height h and the one or more characteristics may be stored in memory 136. Processor 134 of leg-height sensor 110 or 120 may use the correlations stored in memory 136 to determine height h. Processor 134 of leg-height sensor 110 or 120, may also be configured to generate one or more signals indicative of the determined height h and transmit the one or more signals to controller 70.

In other exemplary embodiments, controller 70 may be configured to determine height h of edge 86 of second section 82 relative to frame 22 based on the characteristics of the detected portion of the reflected emitter signal as embodied in the signals transmitted by receiver 132. In these exemplary embodiments, the correlations between height h and the one or more characteristics of the reflected emitter signal may be stored in memory device 72. Controller 70 or machine 10 or 20 may use the correlations stored in memory device 72 to determine height h. Controller 70 may also determine a height of frame 22 relative to track 28 or relative to ground surface 64 based on the determined height h and the known heights $H_2$ and $H_3$. For example, controller 70 may determine a height of frame 22 relative to track 28 as h+$H_2$ (see e.g. FIG. 3) and/or a height of frame 22 relative to ground surface 64 as h+$H_2$+$H_3$ (see e.g. FIG. 3). It is contemplated, however, that controller 70 may use other mathematical operations or algorithms to determine the height of frame 22 relative to ground surface 64 based on the determined height h and known machine heights $H_2$ and $H_3$.

As illustrated in the exemplary embodiment of FIG. 3, leg-height sensor 120 may be positioned on the frame at a predetermined distance from leg column 36. For example, in some embodiments, leg-height sensor 120 may be attached to frame 22 between leg column 36 and drum 50. That is, leg-height sensor 120 may be spaced apart from both leg column 36 (and actuator 88) and from drum 50. Transmitter 130 of leg-height sensor 120 may transmit the beam (e.g. of light, sound, radio wave, etc.) inclined at an angle "θ" relative to frame 22. Angle θ may range, for example, between about 10° to about 80°. As used in this disclosure the term about should be interpreted to encompass normal machining and manufacturing tolerances. For example, about 10° should be interpreted as encompassing angles 10±5°. Similarly, about 80° should be interpreted as encompassing angles 80°±5°. Processor 134 or controller 70 may determine distance "D" between leg-height sensor 120 and track 28 based on, for example, correlations between distance D and the one or more characteristics (e.g. wavelength, amplitude, frequency, phase, time, energy or power) of the portion of the reflected emitter signal received by receiver 132 of leg-height sensor 120. Processor 134 and/or controller 70 may then determine a height "$h_1$" of frame 22 relative to track 28 based on known trigonometric relationships between the height, distance D, and angle θ. It is also contemplated that processor 134 and/or controller 70 may determine the height using distance D and one or more of other mathematical operations, mathematical algorithms, correlations, etc. stored in memory 136 and/or memory device 72. Processor 134 and/or controller 70 may also determine a height of frame 22 relative to ground surface 64 based on the determined height $h_1$ and the known height $H_3$ of track 28 above ground surface 64. For example, processor 134 and/or controller 70 may determine a height of frame 22 above ground surface 64 as $h_1$+$H_3$. When processor 134 determined the height of the frame, processor 134 of leg-height sensor 120 may transmit a signal indicative of the determined height to controller 70.

Although distance D has been illustrated in FIG. 3 and discussed above as being relative track 28, it is contemplated that additionally or alternatively distance D may be determined relative to any other desired position on leg column 36. For example, as illustrated in FIG. 3, leg column 36 may include one or more targets 138 attached to second section 82 at known heights from track 28. Leg-height sensor 120 may be configured to determine distance D of sensor 120 from one or more of the targets 138 based on, for example, a reflected beam generated when the beam transmitted by transmitter 130 of leg-height sensor 120 interacts with the one or more targets 138. Although targets 138 have been illustrated in FIG. 3 as being attached to lower section 82, it is contemplated that one or more targets may additionally or alternatively be attached to upper section 80, actuator 88, and/or track 28.

In some exemplary embodiments, non-contact leg-height sensors 110, 120 may include one or more single-beam LIDAR sensors, multi-beam LIDAR sensors, multi-layer LIDAR sensors, ultrasonic sensors, RADAR sensors, etc. It is contemplated that each of leg columns 36, 38, 40, 42 may include a same type of sensor (e.g. LIDAR, RADAR, ultrasonic, etc.) or one or more leg columns 36, 38, 40, 42 may include sensors of types different from each other. In some exemplary embodiments of machine 10 or 20, at least one non-contact leg-height sensor 110 or 120 may be associated with each of leg columns 36, 38, 40, or 42. Such leg-height sensors 110, 120 may embody a single beam LIDAR sensor that may be configured transmit a single beam of light (e.g. laser, infrared, near infrared, ultraviolet, etc.) towards edge 86 of second section 82 or a target 138 attached to each leg column 36, 38, 40, or 42.

In other exemplary embodiments of machine 10 or 20, leg-height sensor 120 may be configured to detect a height of more than one of leg columns 36, 38, 40, 42. For example, leg-height sensor 120 may be positioned between leg columns 36, 38 or between leg columns 40, 42 and may be a multi-beam LIDAR sensor. Transmitter 130 of multi-beam LIDAR leg-height sensor 120 may be configured to transmit two emitter signals (e.g. laser, visible, infrared, near infrared, ultraviolet, etc. light beams) towards second sections 82 associated with leg columns 36, 38 or 40, 42. Receiver 132 of leg-height sensor 120 may be configured to detect, for example, reflected light beams from, for example, tracks 28, 30 or 32, 34, upper or lower sections 80, 82 of leg columns 36, 38 or 40, 42, or one or more targets 138 associated with leg columns 36, 38 or 40, 42. Controller 70 or processor 134 may be configured to determine height h of frame 22 relative to tracks 28, 30 or 32, 34, respectively, or relative to ground surface 64 adjacent leg columns 36, 38 or 40, 42 based on characteristics (e.g. wavelength, amplitude, frequency, phase, time, energy or power, etc.) of the reflected light beams.

In some exemplary embodiments, controller 70 may also determine an average height of frame 22 relative to ground surface 64 by averaging the determined heights of frame 22 relative to ground surface 64 adjacent leg columns 36, 38 or 40, 42. Although multi-beam LIDAR sensor 120 has been discussed above as transmitting two emitter signals, it is contemplated that multi-beam LIDAR sensor 120 may transmit two or more emitter signals, thereby enabling a single sensor 120 to detect heights of frame 22 relative to more than one of tracks 28, 30, 32, 34 and/or relative the ground surface 64 adjacent more than one of leg columns 36, 38, 40, 42. It is also contemplated that in some exemplary embodiments, multi-beam LIDAR sensor 120 may additionally or alternatively be positioned between leg columns 36, 40 and/or 38, 42 on the left and/or right sides of machine 10, 20.

In yet other exemplary embodiments, one or more of leg-height sensors 110 and 120 may embody a multi-layer LIDAR sensor. Thus, for example, transmitter 130 of leg-height sensor 110 or 120 may transmit multiple emitter signals (e.g. laser, infrared, near infrared, or ultraviolet light beams). Receiver 132 of multi-layer LIDAR leg-height sensor 120 may be configured to detect reflected light beams from edge 86, track 28, or one or more targets 138, and ground surface 64. Multi-layer LIDAR sensor 120 may be configured to simultaneously determine the height of frame 22 relative to both track 28 and ground surface 64.

In some exemplary embodiments, non-contact leg-height sensors 110, 120 may include one or more ultrasonic sensors or RADAR sensors. When leg-height sensors 110, 120 are ultrasonic sensors, transmitter 130 associated with leg-height sensors 110, 120 may emit sound waves (e.g. ultrasonic sound waves). Receiver 132 associated with leg-height sensors 110, 120 may detect characteristics such as amplitude, frequency, phase, or power, etc. of the reflected sound waves and may determine distance h of frame 22 relative to track 28 or ground surface 64 based on the detected characteristics.

In other exemplary embodiments, non-contact leg-height sensors 110, 120 may include one or more RADAR sensors. When leg-height sensors 110, 120 are RADAR sensors, transmitter 130 associated with leg-height sensors 110, 120 may emit radio waves or microwaves. Receiver 132 associated with leg-height sensors 110, 120 may detect characteristics such as amplitude, frequency, phase, or power, etc. of the reflected radio waves or microwaves. Controller 70 and/or processor 134 may determine a height of frame 22 relative to track 28 or ground surface 64 based on the detected characteristics.

In some exemplary embodiments, non-contact leg-height sensors 110, 120 may include one or more imaging devices. For example, sensors 110, 120 may include one or more mono or stereo cameras. It is also contemplated that when sensors 110, 120 are imaging devices, sensors 110, 120 may include one or more of processor 134 and memory 136. In these embodiments, sensors 110, 120 may be configured to obtain 2D or 3D images of frame 22, one or more tracks 28, 30, 32, 34, one or more leg columns 36, 38, 40, and 42, and/or ground surface 64. Controller 70 and/or processors 134 associated with sensors 110, 120 may execute one or more image processing algorithms (e.g. photogrammetry, segmentation, edge detection, projection, convolution, extrapolation, etc.) stored on, for example, memory device 72 and/or memory 136. Controller 70 and/or processor 134 may perform image processing to detect shapes or structures such as frame 22, one or more tracks 28, 30, 32, 34, one or more leg columns 36, 38, 40, and 42, and/or ground surface 64 in the received 2D or 3D images. Controller 70 and/or processor 134 may also be configured to determine a distance of frame 22 relative to one or more tracks 28, 30, 32, 34 in the 2D or 3D images based on, for example, the image processing algorithms discussed above. Further, controller 70 and/or processor 134 may be configured to determine a height of frame 22 relative to one or more tracks 28, 30, 32, 34 and/or ground surface 64 based on the determined distance, a scale or magnification of the 2D or 3D images, and the known geometrical dimensions (e.g. $H_1$, $H_2$, and $H_3$) of machine 10 or 20. Although heights $h_1$, $H_2$, and $H_3$ have been illustrated relative to an upper edge 106 of yoke 104, it is contemplated that in some embodiments, heights $h_1$, $H_2$, and $H_3$ may instead be measured relative to an upper surface 108 of track 28.

A method of determining a height of a frame 22 of milling machine 10 or 20 using one or more non-contact leg-height sensors 110, 120 will be described in more detail below.

INDUSTRIAL APPLICABILITY

Controller 70 and one or more of non-contact leg-height sensors 110, 120 of the present disclosure may be used on milling machine 10 or 20 to determine a height of frame 22 of milling machine 10 or 20 relative to one or more of tracks 28, 30, 32, 34 and/or ground surface 64. In particular, transmitters 130 associated with the one or more sensors 110, 120 may transmit emitter signals, which may be reflected by one or more tracks 28, 30, 32, 34, one or more leg columns 36, 38, 40, 42, one or more actuators 88, and/or by targets 138 attached to the one or more tracks 28, 30, 32, 34, leg columns 36, 38, 40, 42, and/or actuators 88. Receivers 132 associated with the one or more leg-height sensors 110, 120 may detect the reflected emitter signals, including various characteristics (e.g. wavelength, amplitude, frequency, phase, time, energy or power, etc.) of the reflected emitter signals. Controller 70 and/or processor 134 associated with sensors 110, 120 may determine a height of frame 22 relative to one or more of tracks 28, 30, 32, 34 and/or relative to ground surface 64 based on the signals generated by receivers 132.

Figure 5:
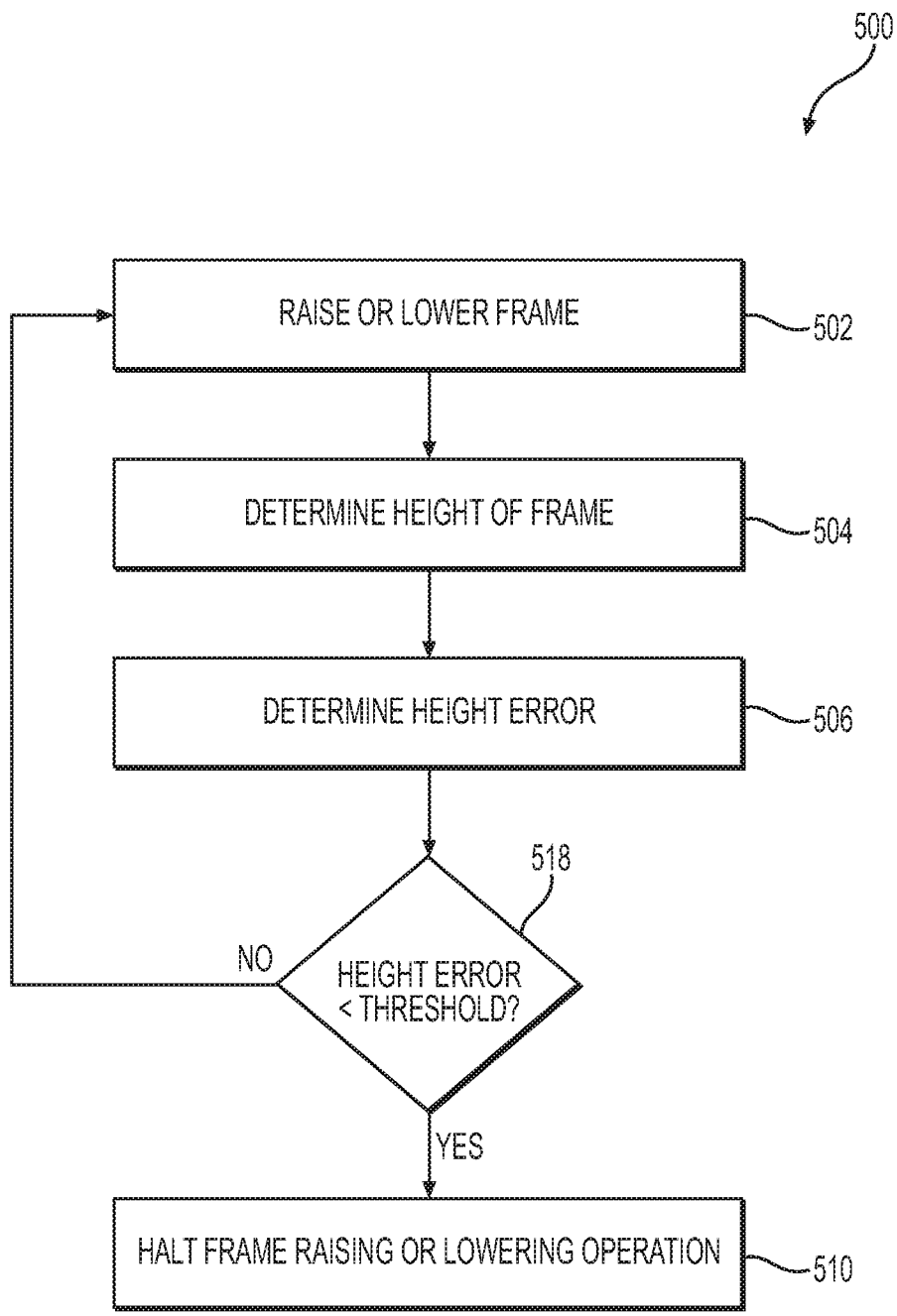
FIG. 5 is an exemplary method of determining a height of a frame of a milling machine relative to a ground surface using the non-contact leg-height sensor of FIG. 4.

FIG. 5 illustrates an exemplary method 500 of determining a height of a frame 22 of milling machine 10 or 20 relative to one or more of tracks 28, 30, 32, 34, and/or ground surface 64 using one or more non-contact leg-height sensors 110, 120. The order and arrangement of steps of method 500 is provided for purposes of illustration. As will be appreciated from this disclosure, modifications may be made to method 500 by, for example, adding, combining, removing, and/or rearranging the steps of method 500. Method 500 may be executed by controller 70. Although method 500 is described below with reference to track 28 and leg column 36, method 500 and its steps as described below and as illustrated in FIG. 5 are equally applicable to track 30 and leg column 38; track 32 and leg column 40; and track 34 and leg column 42.

Method 500 may include a step of raising or lowering frame 22 relative to ground surface 64 (Step 502). An operator may perform such an operation, for example, to raise the frame to a service height for performing maintenance operations or to position frame 22 at a desired height and inclination relative to the ground surface before beginning milling operations. Controller 70 may receive signals from one or more input devices 66 indicating that an operator desires to raise or lower frame 22 of milling machine 10 or 20. Controller 70 may cause one or more pumps associated with milling machine 10 or 20 to pump hydraulic fluid into or out of one or more of head-end chambers 96 of actuators 88 associated with one or more of leg columns 36, 38, 40, or 42 to increase or decrease heights of frame 22 adjacent one or more of tracks 28, 30, 32, and/or 34.

Method 500 may include a step of determining a height of frame 22 relative to tracks 28, 30, 32, 34 and/or ground surface 64 (Step 504). Controller 70 may cause transmitter 130 of leg-height sensors 110, 120 to transmit one or more emitter signals. Receiver 132 associated with transmitter 130 may detect at least a portion of a reflected emitter signal produced when the transmitted emitter signal is reflected by one or more of tracks 28, 30, 32, 34, leg columns, 36, 38, 40, 42, one or more actuators 88, and/or ground surface 64. Receiver 132 may generate a signal indicative of one or more characteristics (e.g. wavelength, amplitude, phase, energy or power) of the reflected emitter signal. Controller 70 and/or processor 134 may determine a height of frame 22 relative to one or more of tracks 28, 30, 32, 34 and/or ground surface 64 adjacent one or more of leg columns 36, 38, 40, 42 based on the signal generated by receiver 132. For example, as discussed above, controller 70 and/or processor 134 may rely on correlations between height h and the one or more characteristics stored in memory device 72 and/or memory 136.

Method 500 may include a step of determining a height error (Step 506). Controller 70 may compare the determined height of frame 22 with a desired height. For example, controller 70 may subtract the determined height h from the desired height to determine the height error.

Method 500 may include a step of determining whether the height error exceeds a threshold (Step 508). When controller 70 determines that the height error exceeds or is about equal to the threshold (Step 508: YES), controller 70 may return to step 502. When controller 70 determines, however, that the height error is less than the threshold (Step 508: NO), controller 70 may proceed to step 510.

Method 500 may include a step of halting the frame raising or lowering operation (Step 510). Controller 70 may cause one or more pumps associated with milling machine 10 or 20 to stop pumping hydraulic fluid into or out of one or more of head-end chambers 96 of actuators 88 associated with one or more of leg columns 36, 38, 40, or 42. Additionally or alternatively, controller 70 may cause a valve element of control valve 144 to move to a flow blocking position, thereby preventing flow of hydraulic fluid into or out of head-end chambers 96 of actuator 88. Stopping the flow of hydraulic fluid in this manner may also stop extension or retraction of actuators 88 associated with the one or more leg columns 36, 38, 40, 42. This in turn may halt raising or lowering of frame 22.

It will be apparent to those skilled in the art that various modifications and variations can be made to the disclosed milling machines and non-contact leg-height sensors. Other embodiments will be apparent to those skilled in the art from consideration of the specification and practice of the disclosed milling machines and non-contact leg-height sensors. It is intended that the specification and examples be considered as exemplary only, with a true scope being indicated by the following claims and their equivalents.

What is claimed is:

1. A milling machine, comprising:
a frame;
a milling drum attached to the frame;
a plurality of ground engaging tracks configured to support the frame and to propel the milling machine in a forward or rearward direction;
a leg column connecting the frame to at least one track from the ground engaging tracks, the leg column including:
an upper section connected to the frame;
a lower section slidably movable relative to the upper section and connected to the at least one track; and
at least one actuator disposed within the leg column and connecting the frame to the at least one track, the at least one actuator being configured to adjust a height of the frame relative to the at least one track;
a non-contact sensor attached to the frame outside the leg column, the sensor being configured to generate a signal indicative of the height of the frame relative to the at least one track, the sensor including:
a transmitter attached to the frame and configured to transmit an emitter signal toward at least one of the ground engaging tracks;
a receiver attached to the frame and configured to:
detect at least a portion of a reflected emitter signal; and
generate the signal based on at least one characteristic of the portion of the reflected emitter signal; and
a controller configured to determine the height based on the signal.

2. The milling machine of claim 1, wherein
the emitter signal includes a beam of one of laser light, visible light, ultraviolet light, infrared light, or near infrared light, and
the receiver is configured to detect the portion of the reflected emitter signal reflected from at least one of an edge of the lower section, the at least one track, or a target attached to the lower section.

3. The milling machine of claim 1, wherein the transmitter is attached to the frame adjacent to the leg column and configured to transmit the emitter signal generally perpendicular to the frame.

4. The milling machine of claim 1, wherein
the sensor is attached to the frame spaced apart from the leg column by a predetermined distance, and
the transmitter is configured to transmit the emitter signal generally inclined relative to the frame.

5. The milling machine of claim 1, wherein the sensor is one of a single-beam LIDAR sensor, a multi-beam LIDAR sensor, a multi-layer LIDAR sensor, an ultrasonic sensor, or a RADAR sensor.

6. A milling machine, comprising:
a frame;
a left front track disposed adjacent a front end of the frame;
a right front track disposed adjacent the front end and spaced apart from the left front track;
a rear track disposed adjacent a rear end of the frame;
a left front leg column including a left front actuator disposed within the left front leg column and connecting the frame and the left front track;
a right front leg column including a right front actuator disposed within the right front leg column and connecting the frame and the right front track;
a rear leg column including a rear actuator disposed within the rear leg column and connecting the frame and the rear track, each of the left front actuator, the right front actuator, and the rear actuator being configured to selectively adjust a height of the frame relative to the left front track, the right front track, and the rear track, respectively, a milling drum connected to the frame and disposed between the front end and the rear end;

an engine configured to rotate the milling drum and propel the left front track, the right front track, and the rear track in a forward or rearward direction;

at least one non-contact sensor attached to the frame and configured to generate at least one signal indicative of the height of the frame relative to at least one of the left front track, the right front track, and the rear track, the non-contact sensor being disposed outside the left leg column, the right leg column, and the rear leg column, the sensor including:
- a transmitter attached to the frame and configured to transmit an emitter signal toward at least one of the the left front track, the right front track, and the rear track;
- a receiver attached to the frame and configured to:
  - detect at least a portion of a reflected emitter signal; and
  - generate the at least one signal based on at least one characteristic of the portion of the reflected emitter signal; and a controller configured to determine heights of the frame relative to the at least one of the left front track, the right front track and the rear track based on the at least one signal.

7. The milling machine of claim 6, wherein the at least one non-contact sensor includes:
- a left front sensor configured to generate a first signal indicative of a left front height of the frame relative to the left front track; and
- a right front sensor configured to generate a second signal indicative of a right front height of the frame relative to the right front track.

8. The milling machine of claim 7, wherein the rear track includes a left rear track and a right rear track, and the at least one non-contact sensor further includes:
- a left rear sensor configured to generate a third signal indicative of a left rear height of the frame relative to the left rear track; and
- a right rear sensor configured to generate a fourth signal indicative of a right rear height of the frame relative to the left rear track.

9. The milling machine of claim 8, wherein the controller is configured to determine a rear height of the frame by:
- determining the left rear height based on the third signal;
- determining the right rear height based on the fourth signal; and
- determining the rear height of the frame as an average of the left and right rear heights.

10. The milling machine of claim 6, wherein each of the left front leg column, the right front leg column, and the rear leg column includes:
- an upper section attached to the frame,
- a lower section slidably movable relative to the upper section, the lower section attached to the respective one of the left front actuator, the right front actuator, and the rear actuator.

11. The milling machine of claim 10, further including
- a transmitter attached to the frame and configured to transmit an emitter signal;
- a receiver attached to the frame adjacent the transmitter and configured to detect at least a portion of the emitter signal reflected from at least one of an edge of the lower section, at least one of the left front track, the right front track, or the rear track, or a target attached to the lower section.

12. The milling machine of claim 11, wherein the transmitter includes a laser transmitter and the emitter signal includes a beam of laser light.

13. The milling machine of claim 12, wherein
the transmitter is attached to the frame adjacent to the respective one of the left front leg column, the right front leg column, and the rear leg column, and
the transmitter is configured to direct the beam generally perpendicular to the frame.

14. The milling machine of claim 12, wherein
the transmitter is attached to the frame at a predetermined distance from the respective one of the left front leg column, the right front leg column, and the rear leg column, and
the transmitter is configured to direct the beam generally inclined relative to the frame.

* * * * *